United States Patent [19]

Vallee

[11] Patent Number: 4,861,103

[45] Date of Patent: Aug. 29, 1989

[54] STRUCTURE FORMING A MOUNTING FOR A SEAT OF AN AIR TRANSPORT CRAFT

[75] Inventor: Bernard Vallee, Antony, France

[73] Assignee: 501 Societe Industrielle et Commerciale de Materiel Aeronauti Que Societe Anonyme, Issoudun, France

[21] Appl. No.: 167,248

[22] Filed: Mar. 11, 1988

[30] Foreign Application Priority Data

Mar. 12, 1987 [FR] France .................. 87 03422

[51] Int. Cl.[4] ............................................. B64D 25/04
[52] U.S. Cl. ................................... 297/216; 188/377; 244/122 R; 243/188.1; 297/232; 297/445
[58] Field of Search ....................... 297/216, 445, 232; 296/65 A; 248/188.1; 188/371, 374, 377; 244/122 R, 118.6

[56] References Cited

U.S. PATENT DOCUMENTS

| | | | |
|---|---|---|---|
| 2,959,207 | 11/1960 | Brewster | 297/216 |
| 3,145,051 | 8/1964 | Rausch | 297/216 |
| 3,603,638 | 9/1971 | McGregor | 297/216 |
| 3,913,707 | 10/1975 | Wastensen et al. | 188/377 X |
| 4,349,167 | 9/1982 | Reilly | 296/65 A X |
| 4,375,300 | 3/1983 | Long et al. | 244/122 R X |
| 4,440,441 | 4/1984 | Marrujo et al. | 297/216 |
| 4,718,719 | 1/1988 | Brennan | 297/216 |

FOREIGN PATENT DOCUMENTS

| | | | |
|---|---|---|---|
| 0053012 | 6/1982 | European Pat. Off. | |
| 2212685 | 9/1973 | Fed. Rep. of Germany | 188/371 |
| 2004769 | 11/1969 | France | |

OTHER PUBLICATIONS

NPRM 86-M, Department of Transportation FAA "Improved Seat Safety Standards; Proposed Rule", 14 CFR Part 25 (Jul. 17, 1986).
DOT/FAA/CT-85/25, "Seat Experimental Results Full-Scale Transport Aircraft Controlled Impact Demonstration", (Jul. 1986).

*Primary Examiner*—Peter R. Brown
*Attorney, Agent, or Firm*—Mason, Fenwick & Lawrence

[57] ABSTRACT

A structure which resists dynamic forces, forming a mounting for a seat of an air transport craft and a seat having such a structure comprising front and rear feet, a front anchorage, an energy absorption device, and a stop mechanism. The front and rear feet are articulated at their upper ends on the seat framework, so that each can pivot about a horizontal and transverse pivot axle. The front anchorage comprises a joint having a traverse horizontal pivot axle, which allows the front foot to pivot forwards from its normal position about the joint pivot axle. The energy absorption device extends between the lower front anchorage and the upper part of the rear foot, but at a distance from the upper rear joint. The energy absorption device includes a stop mechanism for preventing the forward pivoting of the rear foot about its lower rear anchorage on the fixed structure of the craft.

37 Claims, 3 Drawing Sheets

STRUCTURE FORMING A MOUNTING FOR A SEAT OF AN AIR TRANSPORT CRAFT

FIELD OF THE INVENTION

The invention relates to a structure forming a mounting for a seat of an air transport craft, especially for a passenger seat of a commercial aircraft, which comprises an energy absorption device and which resists dynamic forces. The invention also relates to a seat having such a structure.

PRIOR ART

The general problem raised by air transport is ensuring the safety of the persons transported, especially passengers. In particular, attempts have been made to improve the various elements which may enable transported persons to survive when an accident, such as a crash of the aircraft on the ground, occurs.

It is already known that the mounting of seats is of paramount importance for the survival of transported persons, since it determines the manner of deformation and movement of the seat in the event of an impact.

Most known seats for commercial aircraft passengers have a rigid, fixed and non-deformable mounting. The civil aviation standards (FAR) had till then stipulated that these seats should withstand maximum static load tests (4.2 g upwards, 9 g forwards, 3 g laterally, 7.2 g downwards and 1.5 g rearwards, g being the value for gravitational acceleration).

However, it became clear that these standards are insufficient and do not reflect the true situation. In fact, test carried out show that seats meeting these standards have, in practice, a low and badly distributed resistance under the actual conditions of a crash.

The FAA (Federal Aviation Administration) therefore proposed to subject the seats not only to more stringent static tests, but also to dynamic tests which more closely reflect the true situation of a crash on the ground. This proposal is described in the American document NPRM 8611, published in Federal Register/-Volume 51, number 137/17th July 1986, pages 25982 to 25989. In particular, the right-hand column on page 25988 of this document sets out specifically the conditions for the dynamic tests in paragraph 25562 (b).

According to this proposal, the seat must be capable of withstanding the longitudinal impact inclined 10° at an impact speed equal to 13.4 m/s and corresponding to a deceleration of 16 g after 0.09 s and a vertical impact inclined 30° at an impact speed equal to 10.7 m/s and corresponding to a deceleration of 14 g after 0.08 s.

The patent EP-53,012 and the corresponding patent US-4,375,300 describe a structure for an aircraft seat, in which the rear foot is in the form of an inverted "L" in order to increase the space available for the passenger's feet. However, such a structure does not have an energy absorption device and is not capable of successfully undergoing the tests mentioned above. On the contrary, the conditions of resistance which are mentioned in these patents correspond only to the static force values given above. The various legs are fastened to the framework of the seat and to the floor without any possible articulation, thus preventing any substantial deformation of the mounting.

None of the seats known at the present time can withstand these dynamic tests, even when they are equipped with energy absorbers, as suggested by French Patent 2,004,769 or by the American document: DOT/FAA/CT-85/25 (Mark R. Cannon and Richard E. Zimmerman), "Seat Experiment Results, Full-Scale Transport Aircraft, controlled Impact Demonstration", US Department of Transportation, Federal Aviation Administration. Furthermore, these known seats, when they are deformed under the effect of an impact, generate a displacement travel and a change of position which are too great, this being dangerous to the passengers.

It is also known that it is possible to equip the pilot seats of aircraft or helicopters with energy absorption devices in order to damp the impacts attributable to a crash on the ground. However, these seats so equipped cannot be used for common air transport because they are either too costly to be produced on a large scale or too heavy and, above all, are unsuitable for use on commercial aircraft.

The general object of the invention is, therefore, to overcome the disadvantages of the known seats and provide a structure forming a mounting and a seat having such a structure, which, on the one hand, absorb to a considerable extent the energy of the impact of the crash on the ground of an air transport craft and prevent the passenger from being subjected to dangerous or fatal deceleration values, and, at the same, on the other hand, of which the movement during a crash of the aircraft on the ground, causes no or only slight changes in the position of the seat, in particular does not cause any rotation of the seat tending to eject the passenger suddenly.

The particular object of the invention is to provide a structure forming a mounting and a seat having such a structure, which conform to the dynamic tests proposed by the FAA and as are described in the American document NPRM 86/11 mentioned above, whilst at the same time being suitable for use as a passenger seat in a common air transport craft. More specifically, the objects of the invention are to design a structure forming a mounting and a seat which withstand the dynamic forces described above, but also increased static forces in comparison with the prior art, particularly 4.5 g upwards and 4.5 g laterally. Another object of the invention is, at the same time, not to make such a seat heavier in relation to the prior art, and to allow it to be incorporated in the cabin of a common air transport craft, whilst providing acceptable comfort (room for the feet, baggage, etc.) in a minimum amount of space. Yet another object of the invention is to provide a structure forming a mounting which can be substituted for the structure forming a mounting of the seats already equipping common air transport craft, in order to make them conform to the new standards and requirements mentioned above.

SUMMARY OF THE INVENTION

The invention provides a structure forming a mounting for a seat of an air transport craft, comprising a framework, the structure forming a mounting being anchored on the fixed structure of the craft by means of a lower front anchorage of a front foot and by means of a lower rear anchorage of a rear foot, the seat framework being supported by the front and rear feet on which it is mounted, the front foot extending vertically upwards from its lower front anchorage on the fixed structure of the craft, wherein the front and rear feet are articulated at their upper ends on the seat framework, so that each can pivot about a horizontal and transverse pivot axle, in that it possesses an energy absorption device extending between the upper part of the rear foot, but at a distance from the upper rear joint, and the lower front anchorage, and in that it possesses means preventing the forward pivoting of the rear foot about its lower rear anchorage on the fixed structure of the craft.

The invention also provides a structure forming a mounting for a seat of an air transport craft, especially for a passenger seat of a commercial aircraft, on the one hand connected to by anchorage to the fixed structure of the craft, particularly the floor, by means of at least one front anchorage of a front foot and by means of at least one rear anchorage of a rear foot and, on the other hand, connected to the framework of the seat, especially articulated on the framework about transverse horizontal pivot axles, by means of a front joint and a rear joint, defined in that the rear foot is in the form of a console, the convexity of which is directed forwards, and is connected at its upper end in an articulated manner to the rear of the seat framework so as to be pivotable about a transverse horizontal pivot axle relative to this framework, and in that this rear foot and the structure is deformed, this rear foot experiences a forward bending deformation, of which the axis of rotation under theoretical or applied bending is substantially vertically in line with the normal initial position of the axis of articulation of the rear foot on the framework of the seat. This axis of rotation under bending is shifted towards the top of the fixed structure. Moreover, in the normal position, the front foot extends at least substantially vertically from its front anchorage, particularly perpendicularly to the floor of the craft, and the front anchorage has a joint allowing the front foot to pivot forwards from its normal position about a transverse horizontal pivot axle of this front anchorage. The general form and the regions of association of the energy absorption device are such that the orientation of the energy absorption device in relation to the fixed structure remains substantially the same during the deformation of the structure. The dimensions of the energy absorption device are such that it is active, without coming to a stop, for values of a force directed in its axis which are between a non-zero minimum given value $F_0$ and a maximum given value $F_1$.

The invention also relates to a structure forming a mounting for a seat of an air transport craft, comprising a framework forming the seat, a front foot anchored on the floor of the craft by means of a lower front anchorage and extending upwards from this front anchorage perpendicularly to the floor of the craft, this front anchorage having a transverse horizontal pivot axle, about which the front foot can pivot forwards, the front foot being articulated on a front crossbeam of the seat framework by means of a front upper joint comprising a transverse horizontal pivot axle, about which the front foot and the front crossbeam can pivot relative to one another, comprising a rear foot in the form of a console, the convexity on the floor of the craft by means of a lower rear anchorage comprising means preventing any forward pivoting of the rear foot in the vicinity of the lower rear anchorage, the rear foot being articulated on a rear crossbeam of the seat framework by means of a rear upper joint comprising a transverse horizontal pivot axle, about which the rear foot and the rear crossbeam can pivot relative to one another, and comprising an energy absorption device mounted articulated at is upper rear end on the upper part of the rear foot, but at a distance from the upper joint of this rear foot with the crossbeam of the seat framework, the energy absorption device being fastened rigidly at its end near the lower front anchorage of the front foot.

A seat according to the invention has a structure forming a mounting according to the invention which makes it possible to associate it rigidly with the fixed structure of the craft, especially in connecting rails of the floor of this craft.

A seat according to the invention, equipped with at least one structure forming a mounting according to the invention, has increased resistance during a crash of the aircraft on the ground and absorbs a large proportion of the impact energy in the directions of maximum deceleration, to the benefit of the passenger. Furthermore, during the movements of the structure forming a mounting according to the invention, the position of the seat is substantially maintained, and the passenger remains seated in the seat. Moreover, the invention provides a light-weight comfortable seat (the space under the seat remaining free) and a mounting of little bulk and perfectly stable and rigid under the normal conditions of use. A seat according to the invention can successfully undergo stringent dynamic and static tests, particularly the tests mentioned above.

BRIEF DESCRIPTION OF THE DRAWINGS

Other characteristics and advantages of the invention will emerge from the reading of the following description of its preferred embodiments which are illustrated in the accompanying figures of which.

DESCRIPTION OF THE PREFERRED EMBODIMENT(S)

Figure 1:
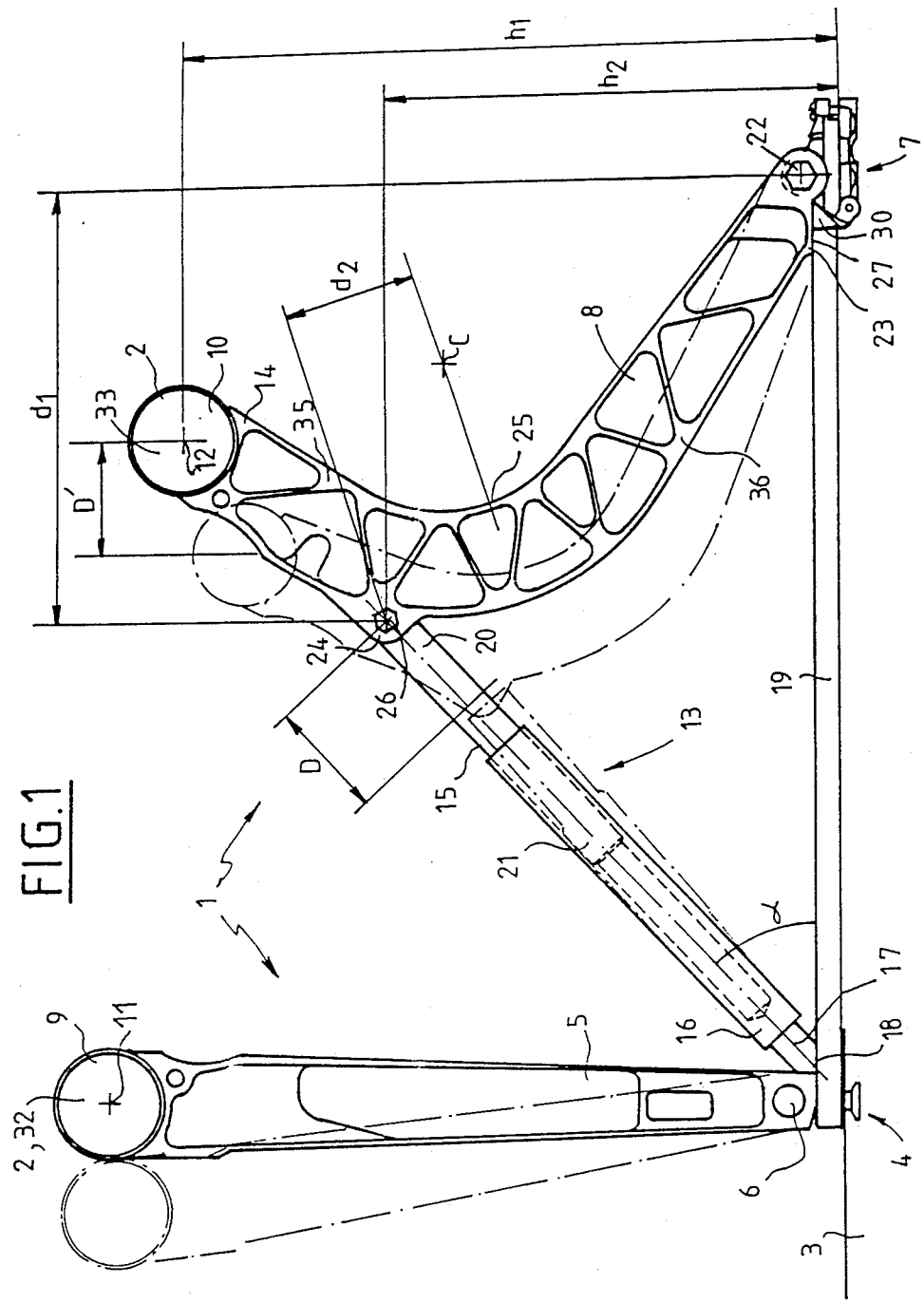
FIG. 1 is a profile view of a structure forming a mounting according to a first embodiment of the invention.

The invention relates to a structure 1 forming a mounting for a seat of an air transport craft. In the figures, the structure is represented in the normal position of use by unbroken lines and in the displaced position after an impact, such as that attributable to the crash of the aircraft on the ground, by dot-and-dash lines. The seat as such is not shown in the figures. The terms "front" and "rear" are defined conventionally in relation to the seat, the passenger facing forwards when he is seated. The structure forming a mounting of the seat is connected to the fixed structure 3 of the craft, usually the floor 3 of this craft. Since the floor 3 is usually substantially horizontal when the craft is at a standstill on the ground, the horizontal directions are defined as the directions parallel to the floor 3 and the vertical direction is defined as being perpendicular to the floor 3 in the positive downward direction. The transverse horizontal direction is the horizontal direction parallel to the back and extending positively to the right (perpendicular to the plane of the figures), and the longitudinal horizontal direction is perpendicular to the transverse horizontal direction and extends positively forwards, and it contains the forward and rearward directions (contained in the plane of the figures). In the rest of the description, the terms "horizontal" and "vertical" are relative and refer either to conventional physical concepts or to the local directions of the craft which are defined above.

The seat possesses a framework 2 defining the sitting surface and the back of this seat and supporting the cushions and their accessory devices.

The invention provides a structure forming a mounting for a seat of an air transport craft, especially for a passenger seat of a commercial aircraft, on the one hand connected to by being anchored to the fixed structure 3 of the craft, especially the floor 3, by means of at least one front anchorage 4 of a front foot 5 and by means of at least one rear anchorage 7 of a rear foot 8 and, on the other hand, connected to the seat framework, especially articulated on the framework 2 about transverse horizontal pivot axles 11, 12, by means of an upper front joint 9 and an upper rear joint 10, the structure 1 also possessing at least one specific energy absorption device 13 connected near or to the front anchorage 4 and connected to the rear foot 8, defined in that the energy absorption device 13 is connected to the upper part 35 of the rear foot 8, but at a distance from the joint 10 in the downward direction, and in that it comprises means 23 limiting or preventing the forward pivoting of the rear foot 8 about its rear anchorage 7 on the fixed structure 3.

The invention also provides a structure forming a mounting for a seat of an air transport craft, especially for a passenger seat of a commercial aircraft on the one hand connected by being anchored to the fixed structure 3 of the craft, especially the floor 3, by means of at least one front anchorage 4 of a front foot 5 and by means of at least one rear anchorage 7 of a rear foot 8 and, on the other hand, associated with the seat framework, especially articulated on the framework 2 about transverse horizontal pivot axles 11, 12, by means of a front joint 9 and a rear joint 10, defined in that the rear foot 8 is in the form of a console, the convexity of which is directed forwards, and is connected at its upper end 14 in an articulated manner to the rear of the seat framework 2, so as to be pivotable about a transverse horizontal pivot axis 12 in relation to this framework 2, and in that this rear foot 8 and the structure 1 are formed in such a way that, when the structure 1 is deformed, this rear foot 8 experiences a forward bending deformation, of which the axis of rotation 37 under theoretical or applied bending is distant from the rear anchorage 7 and is substantially vertically in line with the normal initial position of the axis of articulation 12 of the rear foot 8 on the framework 2 of the seat. The rear foot 8 is formed in such a way that the axis of rotation 37 under theoretical or applied bending is shifted towards the top of the fixed structure 3.

It will be seen later that this axis of rotation under bending 37 can be theoretical, if the rear foot 8 is subjected to elastic or plastic bending deformation, and corresponds to the axis of rotation resulting from this structural bending, or can be applied if the rear foot 8 is composed of two parts 35, 36 articulated on one another.

The energy absorption device 13 is connected to the upper part 35 of the rear foot 8 above the region 25 of maximum curvature of the rear foot 8 and to the region 24 of the rear foot 8 which is located furthest forwards when this rear foot 8 is in the normal position.

According to the invention, the two regions of connection 18, 24 of the energy absorption device 13 to the structure 1 define a direction at least approximate to a probable direction of deceleration when the craft comes in contact with the ground in the event of a crash. This probable direction of deceleration generally corresponds, in practice, to a direction approximate to the true vertical, the craft being inclined forwards and downwards, particularly at 30° relative to the true horizontal. Thus, when the seat is inclined forwards and downwards approximately 30°, the energy absorption device 13 must define a direction as close as possible to the vertical, this indeed occurring with a structure 1 according to the invention.

Furthermore, in order to undergo as successfully as possible the two different dynamic tests stipulated by the new regulation (on the one hand, longitudinal deceleration of 16 g when the seat is horizontal and, on the other hand, vertical deceleration of 14 g with a downward and forward inclination of the seat of 30°), it is desirable if the forces experienced and absorbed by the absorption device 13 are similar for both tests. Consequently, according to the invention, the two regions of connection 18, 24 of the energy absorption device 13 to the structure 1 define a direction oriented in such a way that the forces exerted in this direction and resulting from a longitudinal deceleration of 16 g with the seat horizontal and a vertical deceleration of 14 g when the seat is inclined 30° downwards and forwards are substantially the same. The theoretical optimal value given by the calculation is a direction which is defined by the regions 18, 24 and which forms an angle $\alpha$ relative to the horizontal of the order of 37°.

Figure 2:
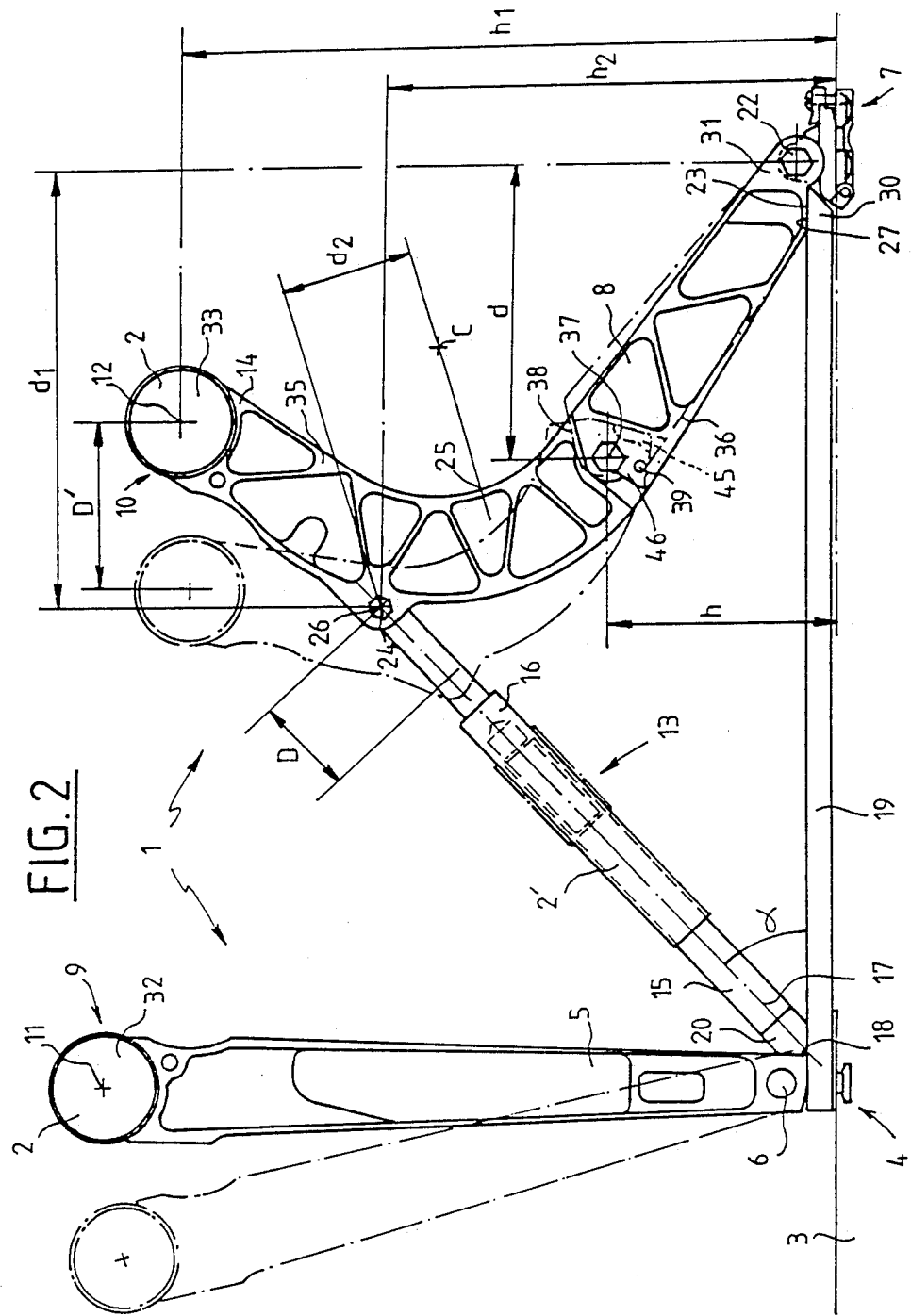
FIG. 2 is a profile view of a structure forming a mounting according to a second embodiment of the invention.

The general form of the structure 1 according to the invention, especially that of the rear foot 8, and the regions of connection 18, 24 of the energy absorption device 13 to the structure 1 are such that the orientation of the absorption device 13 relative to the fixed structure 3 remains substantially the same and, in particular, forms an angle $\alpha$ of the order of 37° relative to the horizontal during the deformation of the structure 1. This general form, as illustrated in FIGS. 1 and 2, and the abovementioned characteristics of the invention make it possible to achieve an unexpected compromise, since the initial position allows the best possible absorption and the position of the seat is maintained, with a minimum vertical downward displacement travel of the seat, at the front and at the rear. Moreover, resistance of the energy absorption device 13 can be determined accurately.

Thus, a structure 1 forming a mounting according to the invention can absorb a large amount of energy in impact directions which are statistically the most frequent and the most important when an aircraft crashes on the ground.

According to the invention, the front anchorage 4 comprises a joint allowing the front foot 5 to pivot forwards from its normal position about a transverse horizontal pivot axle 6 of this front anchorage 4. Furthermore, in the normal position (that is to say under conditions other than those of an accident), the front foot 5 extends at least substantially vertically from its front anchorage 4, particularly perpendicularly to the floor 3 of the craft. Thus, in normal use, the sole weight of the passenger does not tend to deform the structure 1 and subjects the energy absorption device 13 to no stress or to only a little stress. On the contrary, the structure 1 forming a mounting according to the invention is perfectly rigid and stable under the normal conditions of use and of flight of the aircraft.

Preferably, a structure 1 according to the invention has one and only one energy absorption device 13 between the rear foot 8 and the front anchorage 4 for each pair of feet formed by a front foot 5 and a rear foot 8. A structure 1 forming a mounting for a seat, such as a seat with three places, generally has at least two similar pairs of front and rear feet 5 and 8 arranged at a transverse distance from one another, the front foot 5 of each pair being longitudinally opposite the rear foot 8. A single pair of feet is shown and described. The structure 1 is connected to the floor 3 and the actual seat (that is to say, its framework 2, its sitting surface, its back, etc.) is connected to the structure 1 and held at a distance from the floor 3 by means of this structure 1 which is interposed between the floor 3 and the seat.

The energy absorption device 13 preferably comprises two members 15, 16 capable of sliding relative to one another along an axis 17, the sliding movement being accompanied by a dissipation of mechanical energy (plastic deformation, friction, etc.) and, during the absorption of decelerations, by a reduction in the total length of the energy absorption device 13 in the axis 17. The axis 17 of the sliding of the two members 15, 16 relative to one another forms with the horizontal of the craft, at least when the structure is in the normal non-deformed position, an angle $\alpha$ greater than or equal to 30° and less than or equal to 60°, especially of the order of 37°, so that the energy absorption conditions are the same for the two dynamic tests stipulated by the NPRM 86-11 regulation.

Preferably, the energy absorption device 13 comprises a rigid rod 15, one end 20 of which is connected to the rest of the structure 1, especially rigidly to the front anchorage 4 or articulated on the rear foot 8 about an axle 26, and the other end 21 of which is pointed and engaged in a block 16 of synthetic plastic or equivalent, so that this pointed end 21 of the rod 15 can penetrate into the block 16, cutting the material of which it is made, beyond a certain value of the pressure force of the rod 15 on the block 16. The block 16 is also connected to the rest of the structure 1, opposite the end 20 of connection of the rod 15 to the structure 1. Thus, if the rod 15 is connected to the front lower anchorage 4, the block 16 is connected to the rear foot 8. In contrast, if the rod 15 is connected to the rear foot 8, the block 16 is connected to the front lower anchorage 4.

The use of an energy absorption device 13 of the compression type gives the seat a much greater degree of safety in the event of a violent accident which would bring it to a stop than a device of the pull type which can break more easily when it is completely stretched. Moreover, such a compression device 13 is compact, can be inserted advantageously at the proper inclination between the front foot and the rear foot, is inexpensive and can be adjusted easily and accurately in terms of resistance.

According to the invention, the rear foot 8 is in the form of a console, the convexity of which is directed forwards, and is connected at its upper end 14 in an articulated manner to the rear of the framework 2 of the seat, especially to the rear crossbeam 33, that is to say under the junction of the sitting surface and the back of the seat, so as to be pivotable about a transverse horizontal pivot axle 12 in relation to this framework 2, and the energy absorption device 13 is connected to the rear foot 8 in a region 24 located above the region 25 of maximum curvature of the rear foot 8. In fact, better impact-absorbing performances have been found when the region 24 of connection of the energy absorption device to the rear foot 8 is located above the region of maximum curvature 25. Furthermore, too small an inclination of this energy absorption device 13 must be avoided in order to prevent the rear of the seat from being crushed downwards in the event of an impact. This is an additional reason why the angle $\alpha$ is greater than 30°. The energy absorption device 13 is connected in an articulated manner to the rear foot 8 so as to be pivotable relative to the rear foot 8 about a transverse horizontal pivot axle 26.

The articulation of the rear foot 8 on the rear crossbeam 33 forms the upper rear joint 10 of the structure 1 with the framework 2.

Figure 3:
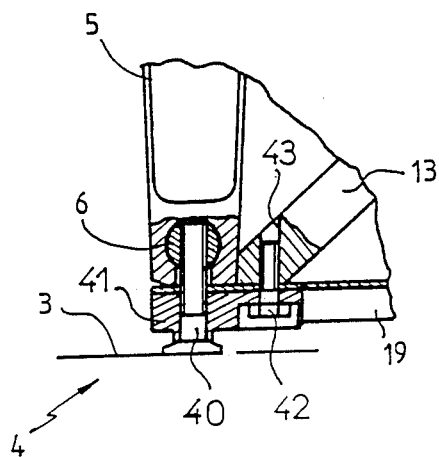
FIG. 3 is a partial sectional view in a longitudinal vertical plane through the front anchorage of a structure forming a mounting according to the invention.

In contrast, the energy absorption device 13 is connected rigidly near or to the front anchorage 4, without the possibility of pivoting about a transverse horizontal axle (FIG. 3). In fact, the kinematics and the dimensions of the structure 1 are such that, during its deformation, the energy absorption device 13 remains substantially in the same axis 17, pivoting about the front anchorage 4 only negligibly, if at all. However, alternatively, a transverse horizontal pivot axle can be provided, if that proves necessary.

According to the invention, means 23 limit or prevent the forward pivoting of at least the lower part 36 of the rear foot 8 about its rear anchorage 7 to the fixed structure 3. Thus, the deformation of the structure 1 according to the invention cannot occur as result of the forward pivoting of the rear foot 8 about its lower rear anchorage 7 which need not have any transverse horizontal pivot axle. In practice, and as illustrated, the rear anchorage 7 has a transverse horizontal pivot axle 22, the function of which is, above all, to allow the double rear anchorage 7 to be connected to the rail of the fixed structure 3 as result of the pivoting of this anchorage 7 about the axle 22. The axle 22 thus serves for mounting the structure 1 on the fixed structure 3. In this case, the means 23 limiting or preventing the forward pivoting of the rear foot 8 comprise a stop formed from a slope 23 of the lower end 31 of the rear foot 8, which interacts with a surface 27 of a fixed member 19 integral with the fixed structure 3, particularly the lower stiffening spar 19. In the figures, the slope 23 extends forwards substantially horizontally from the lower end 31 of the rear foot and interacts by means of its lower face with the upper surface of the rear end 30 of the spar 19.

Since the rear foot 8 cannot pivot forwards, it is either composed of two articulated parts or subjected to structural deformation when the structure 1 itself is deformed under the effect of a deceleration, as will be seen later. The general form of the rear foot 8 as a console of a convexity directed forwards affords outstanding advantages in combination with the characteristics described above.

According to the invention, the energy absorption device 13 extending between the rear foot 8 and the front anchorage 4 is dimensioned to be active and remains so, that is to say without coming to a stop, for values of a force directed in its axis 17 which are between a non-zero minimum given value $F_0$ and a maximum given value $F_1$. Since the minimum value $F_0$ is non-zero, the structure 1 cannot be deformed under the effect of decelerations below those corresponding to the minimum critical values defining an accident.

Thus, for the normal forces experienced by the energy absorption device 13 in its axis 17 which are between zero and $F_0$, the latter is not active and is not deformed, the structure 1 remaining rigid and non-deformable. Beyond $F_0$ and up to $F_1$, the device 13 is active and is capable of absorbing the energy of the impact without coming to a stop. Beyond $F_1$, the energy absorption device 13 comes to a stop and can no longer absorb all the energy which it receives. In practice, for example, $F_0$ corresponds to a longitudinal deceleration of the floor of 9 g and $F_1$ corresponds to a longitudinal deceleration of the floor 3 of 20 g.

Two separate embodiments of the invention are illustrated in FIGS. 1 and 2.

In the first embodiment shown in FIG. 1, the rear foot 8 is connected to the fixed structure 3 of the aircraft and to the seat framework 2 and is rigid and dimensioned, especially in terms of thickness, in such a way that it remains rigid, virtually immobile and non-deformable under normal conditions of use, but experiences plastic deformation, particularly with the effect of a reduction of its curvature, when the deceleration experienced by the seat and its passenger or passengers exceeds a specific value corresponding to an accident situation and subjects the structure 1 to deformation, so that this deformation of the structure 1 takes place only with a dissipation of the energy generated as a result of the elastic and then plastic deformation of the rear foot 8.

The dimensions of the rear foot 8 are such that it starts to experience plastic deformation, particularly with the effect of a reduction in curvature, beyond a deceleration experienced by the seat and its passenger which generates a force giving rise to a dissipation of energy in the energy absorption device 13 (that is to say greater than $F_0$), and preferably beyond a deceleration not bringing this device 13 to a stop (that is to say, for a force below $F_1$). Thus, the dissipation of energy resulting from plastic deformation of the rear foot 8 starts at a deceleration which already gives rise to a dissipation of energy in the energy absorption device 13, the two dissipations being added to one another to absorb the energy of the impact. For lower decelerations, the rear foot 8 will be deformed only slightly, especially in the elastic range, if at all.

On the contrary, the front foot 5 and the framework 2, especially the spars and/or crossbeams 32, 33 to which the structure 1 is connected, are dimensioned to remain rigid and non-deformable or only elastically deformable within the range 1 of decelerations causing no mechanical fracture in the structure 1.

The dimensioning of these various elements involves essentially determining, by known methods of calculation of structures, their form and their distribution in terms of thickness according to the material used and the stresses to which they are subjected.

The structure 1 is dimensioned to allow for a weight of 77.11 kg (170 pounds Avoirdupois) for each passenger. For example, beyond a longitudinal deceleration of 9 g and up to, for example, 14 g or 16 g, the rear foot 8 is deformed only slightly within the elastic range, and the energy absorption device 13 is active, but does not come to a stop. At longitudinal decelerations higher than 14 g or 16 g and, for example, up to 20 g, the energy absorption device 13 is still active, but the rear foot 8 also dissipates a large amount of energy as a result of plastic deformation. At a longitudinal deceleration higher than 20 g, a mechanical fracture can be caused. A similar scale can be determined for the vertical decelerations and the structure 1 dimensioned accordingly. Moreover, the optimal inclination of the energy absorption device 13 is governed by the ratio between the critical longitudinal deceleration (9 g) and the critical vertical deceleration which both generate the minimum force $F_0$ in the axis 17 which is an intrinsic characteristic of the device 13. The rear foot 8 is dimensioned to be deformed beyond a deceleration corresponding to a longitudinal deceleration of the order of 15 g, especially 14 g or 16 g.

In a second embodiment shown in FIG. 2, the rear foot 8 has an upper branch 35 articulated, on the one hand, on the framework 2 and, on the other hand, on a lower fixed part 36 of the rear foot 8, so as to be pivotable forwards from its normal position about a transverse horizontal pivot axle 37 distant from the rear anchorage 7 via the said fixed part 36. The pivot axle 37 of the upper branch 35 is arranged towards the top of the rear anchorage 7 and is raised relative to the fixed structure 3, particularly at a height h of the order of 105 mm. The pivot axle 37 of the upper branch 35 is distant from the rear anchorage 7 in the forward direction, especially at a distance d, for example of the order of 135 mm, which is such that, in the normal position of the upper branch 35, it is vertically in line with or vertically in front of the joint 10 of the upper branch 35 with the framework 2. Preferably, the pivot axle 37 is at the end 46 of the straight lower part 36 of the rear foot 8, the upper part 35 including the region 25 of the rear foot 8 where the curvature is the greatest.

The fixed part 36 of the rear foot 8 preferably comprises a lower branch 36 connected, on the one hand, to the rear anchorage 7 and, on the other hand, to the upper branch 35 by means of the pivot axle 37, the two branches 35, 36 being the continuous extension one of the other in the normal position and defining the rear foot 8 in the form of a console of a convexity directed forwards. The lower branch 36 is straight and extends upwards and forwards from the rear anchorage 7, on which it is mounted, and supports the pivot axle 37 at its upper free end 46. The upper branch 35 is in the form of a console of a convexity directed forwards and extends continuously the lower branch 36 beyond the pivot axle 37, on which the free lower end 45 of the upper branch 35 is mounted.

In this second embodiment, there can be several alternative versions for the deformation of the structure 1 forming a mounting.

In a first alternative version, the rear foot 8 is dimensioned in such a way that it experiences no plastic deformation or only beyond certain deceleration values above $F_1$, the energy absorption device 13 alone making it possible to absorb the energy of a deceleration. The joint 37 is therefore designed to allow the upper movable branch 35 to pivot relative to the lower fixed branch 36 for the entire deformation travel of the energy absorption device 13.

In a second alternative version, the rear foot 8 is dimensioned in such a way that the upper curved movable branch 35 corresponding to the portion of the rear foot 8 of greatest curvature can experience plastic deformation beyond a deceleration value higher than or equal to $F_0$ and below $F_1$. Thus, energy absorption can take place in the specific device 13 provided for this purpose and in the deformation of the curved branch 35 of the rear foot 8 within the plastic range. Means forming a stop limiting the forward pivoting of the upper branch 35 can be provided, so that, beyond a certain pivoting travel of the upper branch 35 about the axle 37, the rear foot 8 has to be deformed and contribute to energy absorption without the subsequent pivoting of the upper branch 35.

In the two preceding alternative versions of this second embodiment, there can be an additional energy absorption device inserted between the two branches 35, 36 near the pivot axle 37. For example, the front lower end 45 of the upper branch 35 supports a knife or is pointed and extended in the form of a knife, so that it can penetrate into a corresponding groove in the upper free end 46 of the lower fixed branch 36 of the rear foot 8, whilst at the same time tearing a tearable material, such as strips of fabric or synthetic foam. In this case, and in combination with the second alternative version, the structure 1 has three energy absorption zones: the specific device 13 inserted between the rear foot 8 and the front anchorage 4, the movable upper branch 35 of the rear foot 8 which experiences plastic deformation, and the energy absorption device inserted between the two branches 35, 36 of the rear foot 8.

Preferably, there are means 38 forming a stop preventing any rearward pivoting of the upper branch 35 of the rear foot 8 from its normal position. These means 38 comprise, for example, two end parts of the branches 35, 36 interacting with one another at the rear of the axle 37 to form a stop, as illustrated in FIG. 2.

It is also possible to provide a device preventing the inopportune forward pivoting of the upper branch 35 about the axle 37 for low decelerations, for example comprising a plastic stud 39 integral with the end 46 of the fixed branch 36 forming a front stop for the lower end 43 of the upper branch 35. This stud 39 can be broken or bent as a result of high decelerations, but withstands low decelerations, especially under the weight of the passenger.

In this second embodiment, the longitudinal displacement D' of the upper end 14 of the rear foot 8 is greater for a smaller vertical displacement of this end 14 and a shorter displacement travel of the energy absorption device 13. The main advantage resulting from this is that the position of the seat is maintained even more effectively during the deformation of the structure 1 and that there is the possibility of absorbing energy for longer.

In the two embodiments described for improving the rigidity of the structure 1, there is also a one-piece lower spar 19 connected directly to the front anchorage 4 of the front foot 5 and the rear anchorage 7 of the rear foot 8, in order to keep the two anchorages 4, 7 at a constant distance from one another, even when the deceleration experienced by the seat and the passenger corresponds to an accident situation.

The anchorages 4, 7 of the structure 1 to the floor comprise single or double dogs interacting with a rail of the fixed structure 3 of the aircraft, in a way known per se. Preferably, the front anchorage 4 is single, whilst the rear anchorage 7 is double to ensure better distribution of the forces on the rail when the rear anchorage 7 is subjected to tearing stress.

The front anchorage 4 shown in FIG. 3 comprises a dog 40 fastened in a rail of the fixed structure 3 of the aircraft and extending upwards through the lower spar 19 in order to engage in the lower end of the front foot 5 and interact with the lower pivot axle 6 of this front foot 5. The dog 40 is fixed to the pivot axle 6 which it keeps in place relative to the fixed structure 3. A longitudinal rib is formed in the front lower end part 41 of the front foot 5, opposite the dog 40, to allow the forward pivoting of the front foot 5 about the axle 6. A plastic blocking means can be provided in this rib to prevent inopportune pivoting. This blocking means is destroyed under high decelerations.

Alternatively, no such rib is provided, the front lower part 41 of the front foot 5 being solid, but the dog is made fragile or plastic in its part located under the pivot axle 6.

The energy absorption device 13 is connected rigidly at 18, by means of its front lower end, to the front end of the spar 19 against the front anchorage 4. For this purpose, a screw 42 is engaged under the spar 19, through which it passes in order to interact with an internal thread 43 made in the energy absorption device 13.

In the normal position, for a distance between the anchorages 4, 7 of the order of 433 mm and a height $h_1$ of the upper rear joint 10 of the order of 307 mm in relation to the floor 3, the point 24 of connection of the device 13 to the rear foot 8 is at a height $h_2$ of the order of 213 mm, is advanced forwards from the rear anchorage 7 a distance $d_1$ of the order of 207 mm and is at a distance $d_2$ of the order of 61 mm towards the top of the straight line joining the rear point 25 of maximum curvature and the center of curvature C. The displacement travel D of the energy absorption device 13 is of the order of 55 mm in the first embodiment and of the order of 47 mm in the second embodiment. The longitudinal displacement travel D' of the upper rear joint 10 is of the order of 50 mm in the first embodiment and of the order of 80 mm in the second embodiment.

The structure 1 forming a mounting according to the invention can be produced very economically and with standard elements similar to those used for a prior non-deformable structure. The other elements necessary for comfort and/or safety and known for non-deformable structures can be adapted to a structure 1 according to the invention (peripheral baggage bar, footrest, etc.).

A seat of an air transport craft, especially a passenger seat of a commercial aircraft, according to the invention is defined in that it possesses a mounting formed from a structure 1 according to the invention. Several pairs of front and rear feet 5, 8, such as that shown, are provided for each seat, to ensure the correct anchorage of the seat on the floor 3 of the aircraft. Crossbars can be provided to connect the pairs of front and rear feet 5, 8 to one another and make the mounting of the seat more rigid, whilst at the same time forming a barrier for the baggage under the seat.

Two pairs of front and rear feet 5, 8 are sufficient for a seat of two or three places.

Preferably, in a seat according to the invention, the front joint 9 connects the structure 1 to the front crossbeam 32 of the seat, and the rear joint 10 connects the structure 1 to the rear crossbeam 33 of the seat.

The deformations of the structure 1 under an impact generating a dissipation of energy in the energy absorption device 13 and as result of the plastic deformation of the rear foot 8 are represented by dot-and-dash lines in the figures. These forward pivoting deformations of the structure 1 which are illustrated are typically those arising as result of a crash of the aircraft on the ground. The sitting surface of the seat remains substantially horizontal and at a level close to that which it originally occupied.

I claim:
1. A structure forming a mounting for a seat of an air transport craft having a fixed structure, said structure being non-deformable under normal conditions of use but deformable when the deceleration exceeds a specific value corresponding to an accident situation, said structure comprising:
- a framework defining a sitting surface and a back surface of the seat;
- a front foot having an upper end, a lower end, an anchorage at said lower end anchoring said front foot to the fixed structure of the craft, and a pivot joint at said upper end articulably connecting said front foot to said framework, said pivot joint having an upper transverse horizontal pivot axle, whereby said front foot can pivot about said upper pivot axle, said anchorage comprising joint means having a lower transverse horizontal pivot axle for allowing said front foot to pivot forward from its normal position about said lower pivot axle;
- a rear foot having an upper end, an upper part adjacent said upper end, a lower end, a lower part adjacent said lower end, an anchorage at said lower end anchoring said rear foot to the fixed structure of the craft, and an upper pivot joint at said upper end articulably connecting said rear foot to said framework, said pivot joint having a horizontal and transverse pivot axle, whereby said rear foot can pivot about said pivot axle;
- a deformable energy absorption device connected to and extending between said front foot anchorage and said upper part of said rear foot and spaced apart from said rear foot pivot joint; and
- prevention means associated with said lower end of said rear foot for preventing said rear foot from pivoting forward about said rear foot anchorage;
- said framework being supported by said front and rear feet.

2. The structure of claim 1, said rear foot comprising a continuously curved console, the curve of said console being convex in the forward direction and having in the normal position a forwardmost point, whereby when said structure is deformed, said rear foot experiences a forward bending deformation, and said axis of rotation under bending is distant from said rear foot anchorage and substantially vertically in line with the normal position of said axle of articulation.

3. The structure of claim 2, said rear foot having a theoretical or applied axis of rotation under bending, said axis of rotation under bending being positioned towards the top of the fixed structure of the craft.

4. The structure of claim 2, said rear foot having a region of maximum curvature and said energy absorption device being mounted on said upper part of said rear foot above said region of maximum curvature.

5. The structure of claim 2, said energy absorption device being mounted on said rear foot in the region of said forwardmost point.

6. The structure of claim 1, further comprising joint means having a transverse horizontal pivot axle for pivotably mounting said energy absorption device on said rear foot about said transverse horizontal pivot axle.

7. The structure of claim 1, said energy absorption device being fastened rigidly to said front foot anchorage so as to preclude its pivoting about a transverse horizontal axle.

8. The structure of claim 1, said front foot anchorage and said upper part of said rear foot to which said energy absorption device is mounted defining first and second fastening regions, respectively, and said first and second fastening regions defining a line, said line forming an angle "a" relative to the horizontal, whereby a force exerted along said line and resulting from a longitudinal deceleration of 16 g, with the seat being horizontal, and a force exerted along said line and resulting from a vertical deceleration of 14 g, with the seat being inclined 30° downwards and forwards, are similar.

9. The structure of claim 8, said angle "a" being approximately 37°.

10. The structure of claim 1, said front foot anchorage and said upper part of said rear foot to which said energy absorption device is mounted defining first and second fastening regions, respectively, said structure, including said rear foot and said fastening regions, all having forms whereby the orientation of said energy absorption device in relation to the fixed structure of the craft remains substantially the same during deformation of said structure.

11. The structure of claim 1, said energy absorption device comprising two members having a common axle and capable of relative sliding movement along said common axle, the sliding movement being accompanied by the dissipation of mechanical energy and, during the absorption of decelerations, by a reduction in the total length of said energy absorption device along said common axle, said common axle forming an angle "a" of at least 30° relative to the horizontal when said structure is in its normal, non-deformed condition.

12. The structure of claim 11, said angle "a" being less than or equal to 60°.

13. The structure of claim 12, said angle "a" being approximately 37°.

14. The structure of claim 1, said front foot and said rear foot defining a pair of feet, and said structure having exactly one said energy absorption device between said rear foot and said front foot anchorage for each said pair of feet.

15. The structure of claim 1, said energy absorption device comprising a rigid rod and a block of material, said rigid rod having a first end and a second end, said first end being connected to one of said front foot anchorage and said upper part of said rear foot and said second end being pointed and engaging said block, said block being connected to the other of said front foot anchorage and said upper part of said rear foot and being formed of a material capable of being cut upon application of a pressure force beyond a certain value, whereby said second, pointed end of said rod can penetrate said block and cut said material upon application of a pressure force beyond said certain value.

16. The structure of claim 1, said rear foot anchorage comprising a transverse horizontal pivot axle;
said lower end of said rear foot having a slope and the fixed structure of the craft having a fixed spar integral therewith, said prevention means being defined by said stop interacting with said fixed spar.

17. The structure of claim 1, said energy absorption device having a longitudinal axle and having dimensions whereby it functions, without coming to a stop, for values of a force acting in the direction of said energy absorption device axle which are between a non-zero minimum given value $F_0$ and a maximum given value $F_1$.

18. The structure of claim 1, said energy absorption device having a longitudinal axle and having dimensions whereby it functions, without coming to a stop, for values of a force acting in the direction of said energy absorption device axle which are between a minimum longitudinal deceleration of 9 g and a maximum longitudinal deceleration of 20 g.

19. The structure of claim 1, said rear foot being rigid and having dimensions, including thickness, whereby said rear foot remains virtually immobile and non-deformable under normal conditions of use, but experiences plastic deformation, especially in terms of bending, with the effect of a reduction of its curvature, when the deceleration experienced by the seat and its passenger or passengers exceeds a specific value corresponding to an accident situation and subjects the structure forming a mounting to deformation, whereby deformation of said structure takes place only with a dissipation of energy as a result of the elastic and then plastic deformation of the rear foot.

20. The structure of claim 19, said rear foot having dimensions whereby it starts to experience plastic deformation including bending with the effect of a reduction of curvature, beyond a deceleration experienced by the seat and its passenger which causes a dissipation of energy in said energy absorption device, and said front foot and said framework having dimensions whereby said front foot and said framework remain rigid or only elastically deformable within the range of decelerations causing no mechanical fracture in said structure.

21. The structure of claim 20, said rear foot having dimensions whereby it is deformed beyond a deceleration corresponding to a longitudinal deceleration of between approximately 14 g–16 g.

22. A structure forming a mounting for a seat of an air transport craft having a floor, said structure being non-deformable under normal conditions of use but deformable when the deceleration exceeds a specific value corresponding to an accident situation, said structure comprising:

a framework forming the seat, said framework including a front crossbeam and a rear crossbeam;

a front foot having an upper end, a lower end, an anchorage at said lower end anchoring said front foot to the floor of the craft, and a front upper joint, said front foot extending upwards perpendicularly to the floor of the craft from said anchorage, said anchorage comprising a transverse horizontal pivot axle about which said front foot can pivot forwards, said front foot being articulated on said front crossbeam by means of said front upper joint, said front upper joint comprising a transverse horizontal pivot axle about which said front foot and said front crossbeam can pivot relative to one another;

a rear foot having an upper end, an upper part adjacent said upper end, a lower end, a lower part adjacent said lower end, an anchorage at said lower end anchoring said rear foot to the floor of the craft, and a rear upper joint, said rear foot being continuously curved in the form of a console the convexity of which is directed forwards, said anchorage including prevention means for preventing any forward pivoting of said rear foot near said rear foot anchorage, said rear foot being articulated on said rear crossbeam by means of said rear upper joint, said rear upper joint comprising a transverse horizontal pivot axle about which said rear foot and said rear crossbeam can pivot relative to one another at said upper end; and a deformable energy absorption device having an upper rear end and a lower front end, said device being articulably mounted at said rear end thereof on said rear foot upper part at a distance from said rear upper joint, and said device being rigidly fastened at said lower front end thereof near said front foot anchorage.

23. The structure of claim 22, further comprising a lower spar having a front end and fastened to said front foot and rear foot anchorages, said energy absorption device being fastened rigidly against said front foot anchorage at said front end of said lower spar.

24. The structure of claim 22, said rear foot lower part comprising a lower branch having an upper end and a lower end and being fixed and extending straight upwards and forwards from said rear anchorage, and said rear foot upper part comprising an upper branch having an upper end and a lower end and being continuously curved in the form of a console of a convexity directed forwards and articulated at said at said lower end thereof on said upper end of said lower branch about a transverse pivot axle.

25. A structure forming a mounting for a seat of an air transport craft having a fixed structure, said structure being non-deformable under normal conditions of use but deformable when the deceleration exceeds a specific value corresponding to an accident situation, said structure comprising:

a framework defining a sitting surface and a back surface of the seat;

a front foot having an upper end, a lower end, an anchorage at said lower end anchoring said front foot to the fixed structure of the craft, and a pivot joint at said upper end articulably connecting said front foot to said framework, said pivot joint having an upper transverse horizontal pivot axle, whereby said front foot can pivot about said upper pivot axle, said anchorage comprising joint means having a lower transverse horizontal pivot axle for allowing said front foot to pivot forward from its normal position about said lower pivot axle;

a rear foot having an upper end, an upper part comprising an upper branch adjacent said upper end, a lower end, a lower part comprising a straight lower branch adjacent said lower end, an anchorage at said lower end anchoring said rear foot to the fixed structure of the craft, and an upper pivot joint at said upper branch articulably connecting said rear foot to said framework, said pivot joint having a horizontal and transverse pivot axle, whereby said rear foot can pivot about said pivot joint pivot axle, said lower part of said rear foot being fixed to and integral with the fixed structure of the craft, said lower branch having an upper end and a lower end, said lower branch being mounted at said lower end on said rear foot anchorage and extending upwardly and forwardly from said rear foot anchorage, and said upper branch having an upper end and a lower end and a transverse horizontal pivot axle at said lower end thereof, said upper branch being articulated on said lower branch about said upper branch pivot axle, said upper branch being supported at said upper branch pivot axle by said upper end of said lower branch, said upper branch being in the form of a curved console of a convexity directed forwardly and comprising a continuous extension of said lower branch beyond said upper branch pivot axle;

a deformable energy absorption device connected to and extending between said front foot anchorage and said upper branch of said rear foot and spaced apart from said rear foot pivot joint; and rear foot prevention means associated with said lower end of said rear foot for preventing said rear foot from pivoting forward about said rear foot anchorage;

said framework being supported by said front and rear feet.

26. The structure of claim 25, said upper branch pivot axle being positioned towards the top of said rear foot anchorage and being raised relative to the fixed structure of the craft.

27. The structure of claim 25, said upper branch pivot axle being positioned towards the front of said rear foot anchorage at a distance "d" which is such that, in the normal position of said upper branch, said upper branch pivot axle is vertically in front of said rear foot pivot joint.

28. The structure of claim 25, further comprising upper branch prevention means forming a stop for preventing any rearward pivoting of said upper branch from said normal position.

29. The structure of claim 25, further comprising energy absorption means inserted between said upper branch and said rear foot lower part for absorbing the energy during forward pivoting of said upper branch about said upper branch pivot axle in relation to said lower part.

30. A structure forming a mounting for a seat of an air transport craft having a fixed structure, said structure being non-deformable under normal conditions of use but deformable when the deceleration exceeds a specific value corresponding to an accident situation, said structure comprising:

a framework defining a sitting surface and a back surface of the seat;

a front foot having an upper end, a lower end, an anchorage at said lower end anchoring said front foot to the fixed structure of the craft, and a pivot joint at said upper end articulably connecting said front foot to said framework, said pivot joint having an upper transverse horizontal pivot axle, whereby said front foot can pivot about said upper pivot axle, said anchorage comprising joint means having a lower transverse horizontal pivot axle for allowing said front foot to pivot forward from its normal position about said lower pivot axle;

a rear foot having an upper end, an upper part adjacent said upper end, a lower end, a lower part adjacent said lower end, an anchorage at said lower end anchoring said rear foot to the fixed structure of the craft, and an upper pivot joint at said upper end articulably connecting said rear foot to said framework, said pivot joint having a horizontal and transverse pivot axle, whereby said rear foot can pivot about said pivot axle, said lower part being fixed to and integral with the fixed structure of the craft and said upper part comprising an upper branch having a transverse pivot axle, said upper branch being articulated on said framework and on said lower part about said upper branch pivot axle, whereby said upper branch is pivotable between a normal position and an accident position;

a deformable energy absorption device connected to and extending between said front foot anchorage and said upper part of said rear foot and spaced apart from said rear foot pivot joint;

first prevention means associated with said lower end of said rear foot for preventing said rear foot from pivoting forward about said rear foot anchorage; and second prevention means forming a stop for preventing any rearward pivoting of said upper branch from said normal position said second prevention means being associated with the articulation between said upper branch and said lower part;

said framework being supported by said front and rear feet

31. The structure of claim 30, further comprising energy absorption means inserted between said upper branch and said rear foot lower part for absorbing the energy during forward pivoting of said upper branch about said upper branch pivot axle in relation to said lower part.

32. The structure of claim 30, said lower part comprising a straight lower branch having an upper end and a lower end, said lower branch being mounted at said lower end on said rear foot anchorage and extending upwardly and forwardly from said rear foot anchorage, and said upper branch being supported at said upper branch pivot axle by said upper end of said lower branch.

33. The structure of claim 30, said upper branch pivot axle being positioned towards the top of said rear foot anchorage and being raised relative to the fixed structure of the craft.

34. The structure of claim 30, said upper branch pivot axle being positioned towards the front of said rear foot anchorage at a distance "d" which is such that, in the normal position of said upper branch, said upper branch pivot axle is vertically in front of said rear foot pivot joint.

35. The structure of claim 30, said upper branch having a lower end, said upper branch being mounted on said upper branch pivot axle at said lower end of said upper branch, and said upper branch being in the form of a curved console of a convexity directed forwardly and comprising a continuous extension of said lower branch beyond said upper branch pivot axle.

36. A structure forming a mounting for a seat of an air transport craft having a floor, said structure being non-deformable under normal conditions of use but deformable when the deceleration exceeds a specific value corresponding to an accident situation, said structure comprising:

a framework forming the seat, said framework including a front crossbeam and a rear crossbeam;

a front foot having an upper end, a lower end, an anchorage at said lower end anchoring said front foot to the floor of the craft, and a front upper joint, said front foot extending upwards perpendicularly to the floor of the craft from said anchorage, said anchorage comprising a transverse horizontal pivot axle about which said front foot can pivot forwards, said front foot being articulated on said front crossbeam by means of said front upper joint, said front upper joint comprising a transverse horizontal pivot axle about which said front foot and said front crossbeam can pivot relative to one another;

a rear foot having an upper end, an upper branch adjacent said upper end, a lower end, a lower branch adjacent said lower end, an anchorage at said lower end anchoring said rear foot to the floor of the craft, and a rear upper joint, said rear foot being continuously curved in the form of a console the convexity of which is directed forwards, said lower branch having an upper end and a lower end and being fixed and extending straight upwards and forwards from said rear anchorage, said upper branch having an upper end and a lower end and being continuously curved in the form of a console of a convexity directed forwards and articulated at said at said lower end thereof on said upper end of said lower branch about a transverse pivot axle, said anchorage including prevention means for preventing any forward pivoting of said rear foot near said rear foot anchorage, said rear foot being articulated on said rear crossbeam by means of said rear upper joint, said rear upper joint comprising a transverse horizontal pivot axle about which said rear foot and said rear crossbeam can pivot relative to one another at said upper end;

a deformable energy absorption device having an upper rear end and a lower front end, said device being articulably mounted at said rear end thereof on said rear foot upper part at a distance from said rear upper joint, and said device being rigidly fastened at said lower front end thereof near said front foot anchorage; and energy absorption means inserted between said upper branch and said lower branch for absorbing the energy during the forward pivoting of said upper branch.

37. The structure of claim 36, further comprising a rear foot absorption device inserted between said upper branch and said rear foot lower part for absorbing the energy during forward pivoting of said upper branch about said upper branch pivot axle in relation to said lower part.

* * * * *